Jan. 24, 1950     K. CLEAVER     2,495,508
DETACHABLE ORNAMENTAL SPECTACLE FRAME
Filed July 7, 1948     2 Sheets-Sheet 1
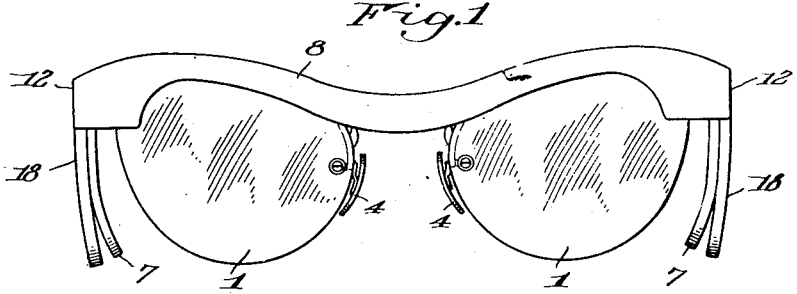
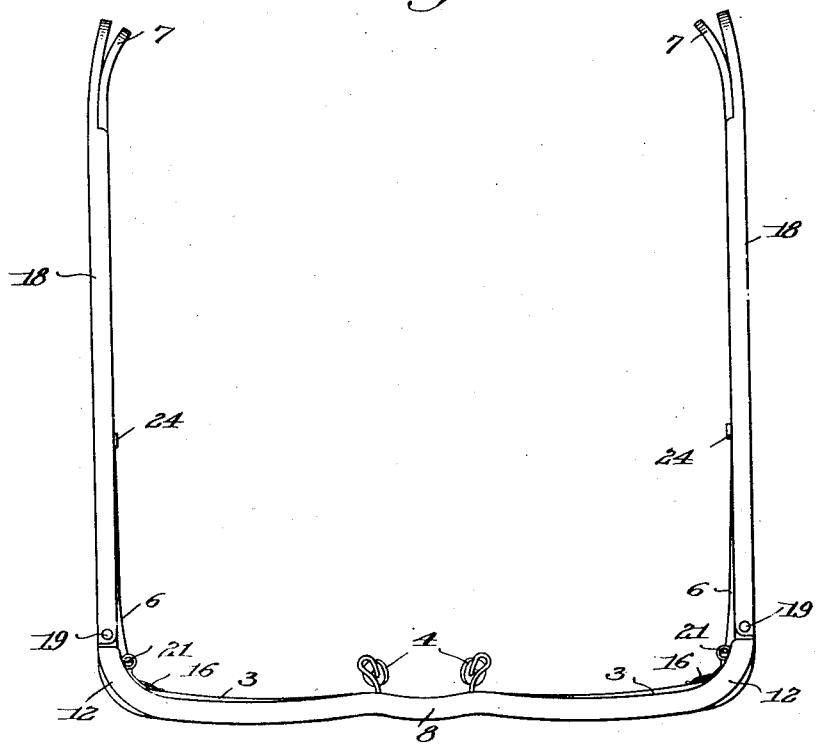
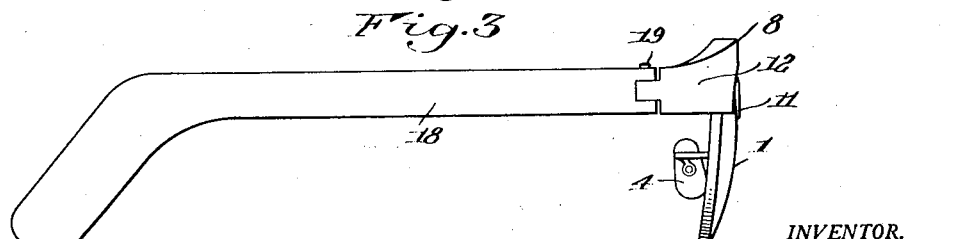
INVENTOR.
Katherine Cleaver
BY Harold E. Stonebraker,
her Attorney

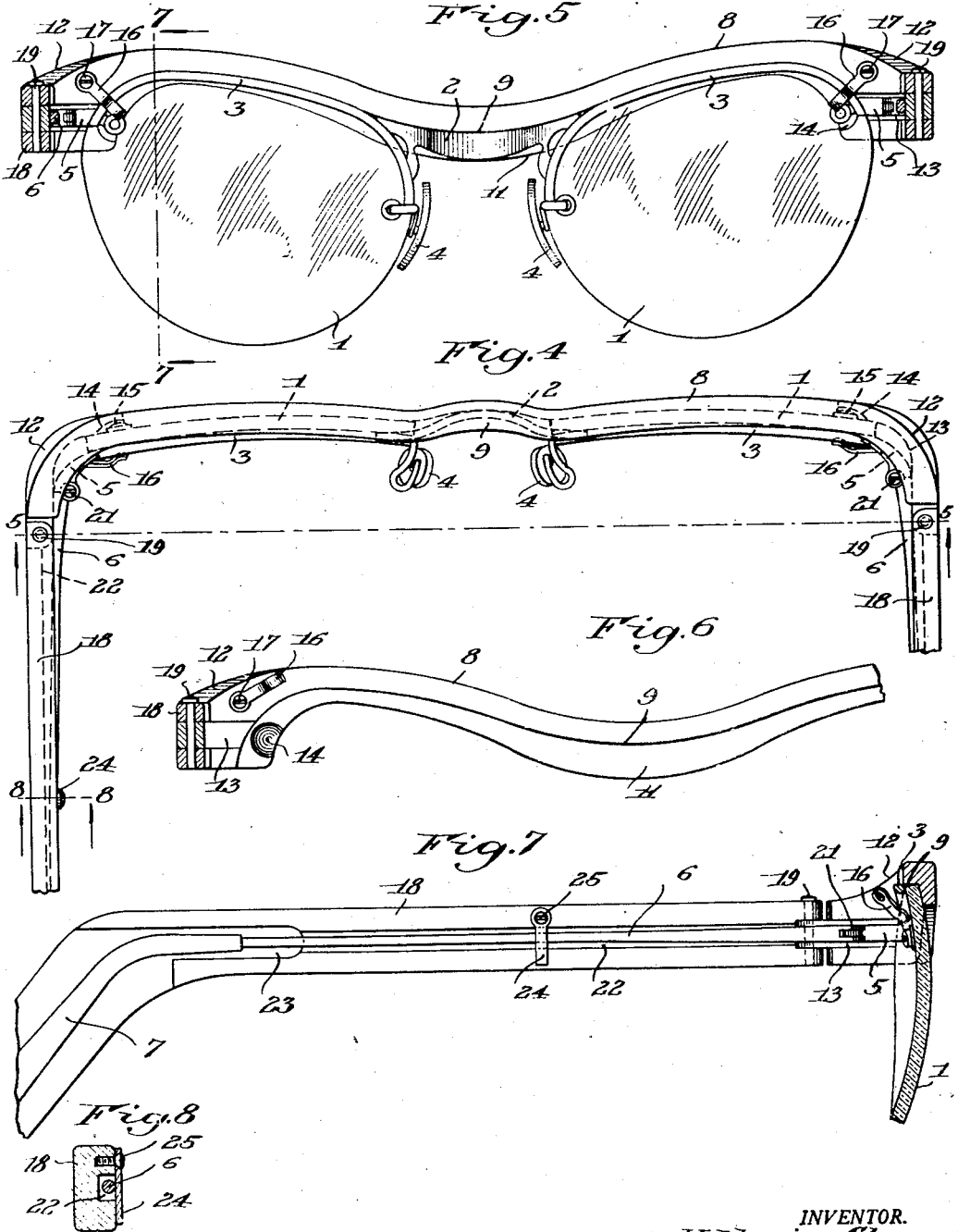

Patented Jan. 24, 1950

2,495,508

UNITED STATES PATENT OFFICE 2,495,508

DETACHABLE ORNAMENTAL SPECTACLE FRAME

Katherine Cleaver, Indianapolis, Ind., assignor to Continental Optical Company, Inc., Rochester, N. Y., a corporation of Indiana Application July 7, 1948, Serial No. 37,330

2 Claims. (Cl. 88—41)

This invention relates to a detachable ornamental spectacle frame, with particular reference to the type of spectacle including metal lens rims and mounts, a metal bridge, and metal temples, and has for its purpose to afford a structure that enables readily placing an ornamental frame of any selected contour and appearance over the metal frame of the spectacle to attain varying effects.

Various types of plastic spectacle frames have come into use so that it has become not unusual for a person to have several spectacles to provide a different appearance and effect depending upon the time of day and the occasion, and it is a purpose of the invention to enable using a single spectacle and pair of lenses with any number of ornamental frames of contrasting appearance and material which may be detachably secured to the metal spectacle frame and worn thereon as desired, without interfering in any way with the normal use of the spectacle and without discomfort to the wearer.

Another purpose of the invention is to provide a construction of ornamental frame that will conceal the upper edges of the lenses, the metal bridge, and the metal mounts on the lenses as well as the metal temples, so as to create any effect according to the shape and color of the ornamental frame, and to fasten the ornamental frame detachably and easily on to the metal spectacle frame.

Still a further object of the invention is to provide a structure in which the temples of the metal frame can be secured to the temples of the ornamental frame and the lenses of the spectacle secured in the front portion of the ornamental frame in such manner as to permit relative sliding and simultaneous swinging movement of the metal and ornamental temples on the metal and ornamental frames respectively when folding the spectacle.

An additional purpose of the invention is to afford a construction that is in every way practical and can be manufactured economically so as to permit the user of a metal spectacle frame to have available as many ornamental frames as desired, any of which can be selectively attached to the metal frame as circumstances warrant.

Still another object of the invention is to afford a structure in which the lenses and metal frame of the spectacle are securely and firmly held in the ornamental frame, while permitting the latter to be quickly and readily attached to or removed from the spectacle, and in a manner not to interfere with the normal and proper functioning of the lenses for vision purposes.

To these and other ends, the invention consists in the construction and arrangement that will appear clearly from the following description when read in conjunction with the accompanying drawings, the novel features being pointed out in the claims following the specification.

In the drawings:

Fig. 1 is a view in front elevation showing the invention in position on a conventional spectacle;

Fig. 2 is a plan view of the same;

Fig. 3 is a view in side elevation of the same;

Fig. 4 is an enlarged plan view with the temples partially broken away;

Fig. 5 is a sectional view on line 5—5 of Fig. 4, showing the spectacle and front portion of the ornamental frame in rear elevation;

Fig. 6 is an enlarged sectional view taken on line 6—6 of Fig. 5, showing the front portion of the ornamental frame in rear elevation, partially broken away, and removed from the spectacle;

Fig. 7 is an enlarged sectional view on line 7—7 of Fig. 5, showing two adjacent temples of the ornamental and spectacle frames in elevation, and Fig. 8 is an enlarged detail sectional view on the line 8—8 of Fig. 4.

Referring more particularly to the drawings in which like reference numerals refer to the same parts throughout the several views, the invention is illustrated in connection with a conventional type of spectacle including lenses 1, metal bridge 2, metal lens rims 3 engaging the upper edges of the lenses, nose pieces 4, and metal lens mounts 5 to which are pivotally connected the metal temples 6, as usual in this type of construction, the metal temples 6 being provided with plastic end pieces 7 for engagement behind the ear if desirable, although the invention may be successfully used with frames in which the temples are metallic throughout and with other types of metal frames, as for instance where the lenses are supported only by mounts at the ends instead of by metal rims engaging the upper edges of the lenses and connected to the bridge as illustrated in the embodiment herein disclosed.

The invention comprises an ornamental frame which can be detachably fastened to the spectacle and is constructed of any desirable plastic or other material suitable for the purpose. The ornamental frame when arranged in position conceals the metal bridge and upper edges of the lenses together with the metal temples of the spectacle, and creates the effect of a plastic frame, which enables selectively using any one of a number of plastic frames of different form or appearance on a metal frame spectacle.

To accomplish this, the ornamental frame preferably comprises an integral front portion 8 formed of suitable plastic material and shaped as shown to conform to the vertical and horizontal curvatures of the bridge and the upper edges of the lenses as well as the metal rims surmounting them. The front portion 8 is recessed on its inner surface, affording a top wall 9 that overlies and conforms to the curvature of the upper edges of the bridge 2, metal rims 3, and lenses 1, said parts being seated against a forward wall 11 which conforms to the horizontal curvature and overlies the front surfaces of the bridge and the upper portions of the lens rims 3 and lenses 1, which are concealed by said front wall 11.

The front portion 9 terminates in the rearwardly curved end portions 12 that conform to the curvature of the lens mounts 5 which are seated in the channels or grooves 13 formed in the curved end portions 12 and thus interlock therewith, while 14 designate depressions or recesses formed in the wall 11 of the front portion 9 to accommodate the heads 15 of the screws that fasten the mounts 5 to the lenses, see Fig. 4. The spectacle is detachably held in the position shown in Fig. 5 attached to the front portion of the ornamental frame by means of suitable fastening devices such as the spring clips 16 pivoted at 17 to the ends of the front portion and adapted to swing over the adjacent surfaces of the lenses, as shown in Fig. 3, to hold the spectacle in position, or to be swung outwardly to the position illustrated in Fig. 6 to release the spectacle from the ornamental frame. When in position, the spectacle is locked in relation to the ornamental frame by means of the spring clips 16 which hold the front surfaces of the lenses against the forward wall 11 of the front portion while the lens mounts 5 of the spectacle frame are seated in the grooves or channels 13 and therefore held against movement transversely of the groove toward or from the pivotal point of the clip 16.

18 designates the temple of the ornamental frame that is pivoted to the curved end portion 12 at 19, while 21 designates the pivotal points between the lens mounts 5 of the lenses and the metal temples 6 which latter are received in grooves or channels 22 extending endwise of the temples 18. The rear portions of the temples 18 may have the channels 22 enlarged, as shown at 23, to accommodate the enlarged plastic rear portions of the metal temples and to permit the necessary relative endwise movement between the temples of the metal and ornamental frames for the purpose that will appear presently. Each metal temple is held in the temple 18 within the groove or channel of the latter by means of a spring clip 24 that is pivoted to the temple 18 at 25, see Figs. 7 and 8, and adapted to swing over the metal temple 6 to hold the latter in place, as shown in Fig. 7, or to swing to a horizontal position, referring to Figs. 7 and 8, to release the metal temple when the ornamental temple is to be removed.

The pivots 19 and 21 connecting the temples of the ornamental and metal frames respectively are offset as shown in Fig. 4 and so related that when the ornamental frame is assembled in operative position on the metal frame, the temples can be swung over the lenses for folding when desired and during such folding movement, the metal temples 6 move slightly endwise of the ornamental temples, there being sufficient freedom of movement and looseness of fit between the metal temples and the grooves in which they are held to permit such sliding action, and the offset relationship between the pivots 19 and 21 permits the necessary folding of the temples when desired.

When the temples are in their outermost position, as shown in Figs. 2 and 4, the spectacle is used as ordinarily and gives the appearance of a plastic frame which may be of any color or shape and provided with any suitable ornamentation, the metal temples and the upper portions of the bridge and lenses being entirely concealed by the ornamental frame.

The ornamental frame is attached by positioning the spectacle with the upper edges of the lens and bridge against the forward wall 11 and under the overlying wall 8, then swinging the spring clips 16 downwardly to the position shown in Fig. 5 to hold the lenses in such position, after which the metal temples are pushed into the grooves 22 of the ornamental temples 18 and the spring clips 24 swung over the metal temples to hold the latter in place, and the spectacle is then ready to be used as in the usual manner. When it is desired to use the metal frame spectacle without an ornamental frame or with an ornamental frame of some other color or conformation, this is accomplished by swinging the spring clips 16 and 24 on their pivots to release the lenses and metal temples, so that the spectacle can instantly be withdrawn from the ornamental frame.

While the invention has been described with respect to the particular construction shown herein, it is not confined to the detailed arrangement illustrated, and this application is intended to cover such modifications or departures as may come within the purposes of the improvements or the scope of the following claims.

I claim:

1. The combination with a spectacle including metal temples, lenses, metal lens rims and end portions, and a metal bridge the upper edge of which forms a continuous curve with the upper edges of the lenses and lens rims, of a detachable ornamental plastic frame comprising an integral plastic front portion that has a recess extending throughout its length on its rear face beneath the top thereof, said recess receiving the metal bridge and the upper edges of the lenses and providing a top wall that overlies the top edges of the lenses and the top edge of the metal bridge and a front wall against which the lenses and metal bridge abut, the rear surfaces of the lenses being flush with the rear surface of said top wall of the front portion of the plastic frame, said front portion including rearwardly curved plastic end portions having channels that receive the adjacent end portions of the metal frame to interlock therewith, fastening devices pivoted to said end portions of the plastic frame and positionable over the lenses to hold the ornamental frame in position on the metal spectacle frame, plastic temples pivotally connected to said plastic end portions and having channels that receive the metal temples of the metal spectacle frame, and fastening devices pivoted to said plastic temples and positionable over the metal temples.

2. The combination with a spectacle including metal temples, lenses, metal lens rims and end portions, and a metal bridge the upper edge of which forms a continuous curve with the upper edges of the lenses and lens rims, of a detachable ornamental plastic frame comprising an integral plastic front portion that has a recess extending throughout its length on its rear face beneath the top thereof, said recess receiving the metal bridge and the upper edges of the lenses and providing a top wall that overlies the top edges of the lenses and the top edge of the metal bridge and a front wall against which the lenses and metal bridge abut, the rear surfaces of the lenses being flush with the rear surface of said top wall of the front portion of the plastic frame, said front portion including rearwardly curved plastic end portions having channels that receive the adjacent end portion of the metal frame to interlock therewith, fastening devices pivoted to said end portions of the plastic frame and positionable over the lenses to hold the ornamental frame in position on the metal spectacle frame, plastic temples pivotally connected to said plastic end portions and having channels that receive the metal temples of the metal spectacle frame, and fastening devices pivoted to said plastic temples and positionable over the metal temples, the temple hinges of the metal spectacle frame being offset from the temple hinges of the ornamental plastic frame and the temples of the respective frames being in contact and relatively slidable endwise upon folding.

KATHERINE CLEAVER.

REFERENCES CITED

The following references are of record in the file of this patent:

UNITED STATES PATENTS

| Number | Name | Date |
| --- | --- | --- |
| 1,744,993 | Tamplin | June 28, 1930 |
| 1,806,524 | Donnelly | May 19, 1931 |
| 2,284,630 | Banks | June 6, 1942 |
| 2,386,998 | Young | Oct. 16, 1945 |

FOREIGN PATENTS

| Number | Country | Date |
| --- | --- | --- |
| 466,034 | Great Britain | May 20, 1937 |